United States Patent
Song et al.

(10) Patent No.: US 12,454,086 B2
(45) Date of Patent: Oct. 28, 2025

(54) METHOD AND DEVICE FOR DIRECTLY PREPARING FOAMED POLYLACTIC ACID (PLA) PRODUCT FROM PLA MELT

(71) Applicant: JHM Engineering and Technology (Ningbo) Co., Ltd., Ningbo (CN)

(72) Inventors: Yanan Song, Ningbo (CN); Lejun Wang, Beijing (CN); Weiwei Huang, Ningbo (CN); Zongqiang Zheng, Ningbo (CN); Yining Liu, Beijing (CN)

(73) Assignee: JHM Engineering and Technology (Ningbo) Co., Ltd., Ningbo (CN)

(*) Notice: Subject to any disclaimer, the term of this patent is extended or adjusted under 35 U.S.C. 154(b) by 780 days.

(21) Appl. No.: 17/421,017

(22) PCT Filed: Jul. 18, 2019

(86) PCT No.: PCT/CN2019/096553
§ 371 (c)(1),
(2) Date: Jul. 7, 2021

(87) PCT Pub. No.: WO2020/143208
PCT Pub. Date: Jul. 16, 2020

(65) Prior Publication Data
US 2022/0097274 A1    Mar. 31, 2022

(30) Foreign Application Priority Data

Jan. 8, 2019   (CN) .................... 201910016587.8

(51) Int. Cl.
*B29C 48/00*    (2019.01)
*B29C 48/36*    (2019.01)
(Continued)

(52) U.S. Cl.
CPC ...... *B29C 48/0012* (2019.02); *B29C 48/0013* (2019.02); *B29C 48/022* (2019.02);
(Continued)

(58) Field of Classification Search
CPC ... B29C 48/0012; B29C 48/92; B29C 48/022; B29C 48/385; B29C 48/397;
(Continued)

(56) References Cited

U.S. PATENT DOCUMENTS 3,344,092 A * 9/1967 Pavuk .................... C08J 9/08
                                                           524/424
5,707,573 A * 1/1998 Biesenberger ...... B29C 44/3446
                                                           264/50
(Continued)

FOREIGN PATENT DOCUMENTS

| CN | 1600814 A | 3/2005 |
|---|---|---|
| CN | 1900389 A | 1/2007 |

(Continued)

OTHER PUBLICATIONS

Polylactones 48. SnOct2-Initiated Polymerizations of Lactide: A Mechanistic Study Hans R. Kricheldorf,* Ingrid Kreiser-Saunders, and Andrea Stricker Macromolecules 2000, 33, 702-709 (Year: 2000).*

(Continued)

*Primary Examiner* — Galen H Hauth
*Assistant Examiner* — John Robitaille
(74) *Attorney, Agent, or Firm* — Bayramoglu Law Offices LLC

(57) ABSTRACT

A method for directly preparing a foamed polylactic acid (PLA) product from a PLA melt includes PLA melt preparation, feeding, and two-stage extrusion. In the two-stage extrusion, a pressure at an outlet of a first-stage twin-screw extruder is 15 MPa to 17 MPa, a PLA melt is fed at a rate of 250 kg/h, a foaming additive is fed at a rate of 7.5 kg/h to 10 kg/h, and a foaming gas is fed at a rate of 2.8 L/h to 7.5 L/h. The method can ensure both foamability and quality of a material and reduce more than ⅓ of energy consump- (Continued)

tion; and an obtained product has an adjustable foaming rate of 3 to 25, a crystallinity of 40.3% to 48.5%, a tensile strength of 8.7 MPa to 19.6 MPa, and an apparent density of 0.05 g/cm$^3$ to 0.4 g/cm$^3$.

7 Claims, 4 Drawing Sheets

(51) Int. Cl.
*B29C 48/385* (2019.01)
*B29C 48/395* (2019.01)
*B29C 48/625* (2019.01)
*B29C 48/92* (2019.01)
*C08J 9/14* (2006.01)
*B29C 48/58* (2019.01)
*B29K 67/00* (2006.01)
*B29K 105/04* (2006.01)

(52) U.S. Cl.
CPC .......... *B29C 48/362* (2019.02); *B29C 48/385* (2019.02); *B29C 48/397* (2019.02); *B29C 48/625* (2019.02); *B29C 48/92* (2019.02); *C08J 9/144* (2013.01); *B29C 48/58* (2019.02); *B29K 2067/046* (2013.01); *B29K 2105/04* (2013.01); *C08J 2201/03* (2013.01); *C08J 2367/04* (2013.01)

(58) Field of Classification Search
CPC . B29C 48/0013; B29C 48/362; B29C 48/625; C08J 9/144
See application file for complete search history.

(56) References Cited

U.S. PATENT DOCUMENTS

| | | | | |
|---|---|---|---|---|
| 6,849,667 B2 * | 2/2005 | Haseyama | ............... | C08J 9/122 |
| | | | | 521/131 |
| 2009/0311937 A1 * | 12/2009 | He | ........................ | D04H 1/435 |
| | | | | 442/400 |

FOREIGN PATENT DOCUMENTS

| | | | | | |
|---|---|---|---|---|---|
| CN | 102037053 A | | 4/2011 | | |
| CN | 201907193 U | * | 7/2011 | .......... | B29C 47/364 |
| CN | 102470597 A | | 5/2012 | | |
| CN | 102675842 A | | 9/2012 | | |
| CN | 103819885 B | | 4/2016 | | |
| CN | 106476298 A | | 3/2017 | | |
| CN | 106751611 A | | 5/2017 | | |
| CN | 108752734 A | | 11/2018 | | |
| CN | 109776848 A | | 5/2019 | | |
| CN | 111777359 A | * | 10/2020 | | |
| WO | WO-9932544 A1 | * | 7/1999 | ............. | B29C 44/08 |

OTHER PUBLICATIONS

English abstract of CN 111777359 A (Year: 2020).*
GB1033-86, Test method for density and relative density of plastics, 1986, Standards Press of China.
GB/T 6344-2008, Flexible cellular polymeric materials—Determination of tensile strength and elongation at break, Aug. 2008, General Administration of Quality Supervision, Inspection and Quarantine of the People's Republic of China; Standardization Administration of China.
GB/T 3682-2000, Determination of the melt mass-flow rate (MFR) and the melt volume-flow rate (MVR) of thermoplastics, Oct. 2000, General Administration of Quality Supervision, Inspection and Quarantine of the People's Republic of China; Standardization Administration of China.

* cited by examiner

METHOD AND DEVICE FOR DIRECTLY PREPARING FOAMED POLYLACTIC ACID (PLA) PRODUCT FROM PLA MELT

CROSS REFERENCE TO THE RELATED APPLICATIONS

This application is the national phase entry of International Application No. PCT/CN2019/096553, filed on Jul. 18, 2019, which is based upon and claims priority to Chinese Patent Application No. 201910016587.8, filed on Jan. 8, 2019, the entire contents of which are incorporated herein by reference.

TECHNICAL FIELD

The present disclosure relates to a method and a device for directly preparing a foamed polylactic acid (PLA) product from a PLA melt, and belongs to the technical field of polymer material applications.

BACKGROUND

In recent years, the explosive growth of the express delivery and take-away industries has brought much convenience to people's lives, but it also leads to many problems such as packaging pollution. The report "Big Data for Take-Away in China" released by the take-away platform Ele.me shows that there are 600 million take-out users in the Chinese market; and at least 400 million takeaways were delivered in China every week in 2016, which resulted in the use of at least 400 million disposable packaging boxes, 400 million plastic bags, and 400 million disposable tableware. Therefore, how to manage take-away product waste has become an imperative problem to be solved in a modern society.

PLA is a fully-biodegradable material derived from renewable resources, which is an ideal safe and environmentally-friendly packaging material. Conventional PLA materials require a long crystallization time. Under a common blister molding or injection molding process, a material cannot undergo full crystallization, resulting in a low temperature resistance of 50° C. to 60° C. Moreover, the price of PLA itself is 2 to 3 times that of ordinary plastics, and it is unacceptable for ordinary consumers, which causes difficulty in promoting PLA materials on the market. Foaming for reducing a weight of a PLA product is an important way to improve a price-quality ratio of the PLA product. Foamed PLA materials can be used to replace the existing foamed PS materials, paper pulp materials, etc., which have a broad market prospect.

A PLA resin obtained by conventional polymerization cannot be directly foamed. A PLA melt obtained by polymerization needs to be first cooled, pelletized, crystallized, and dried, and then melt-blended with additives such as a melt enhancer and a nucleating agent by a twin-screw extruder to obtain a foamable PLA material. The foamable PLA material needs to be dried again, melted and plasticized by a screw of an extrusion foaming production line, mixed with a foaming gas, and then extruded by a die to achieve foaming and shaping, so as to obtain a foamed PLA product. PLA obtained from polymerization needs to undergo repeated heating, blending, and cooling processes including pelletization, crystallization and drying, cooling, dehumidification, melt-blending, pelletization, drying, cooling, dehumidification, melt-blending, and foaming, so as to obtain a foamed product. However, PLA has poor degradation ability under damp and heated conditions, so incomplete drying and high-temperature and high-shear environments are likely to cause a reduction of molecular weight and viscosity of the resin and make a material become yellow and brittle. Especially in the foaming procedure, incomplete drying is more likely to cause problems such as bubble-breaking and rough surfaces. In addition, repeated heating and cooling, pelletization, and blending also cause large energy consumption and increase production costs, and these procedures are indispensable in a traditional production process. Consequently, there is little space for a reduction in the cost of PLA products, which restricts the market development of PLA products.

The Chinese patent CN106751611A discloses a preparation method of a PLA foaming-specific resin, which is a conventional plastic modification method. In the method, an existing PLA resin is subjected to modification to obtain a foamable PLA resin, which does not involve a PLA foaming process. The present disclosure relates to a method for directly preparing a foamed product from a PLA melt, including the entire process of PLA resin modification and foamed product production, which makes engineering integration and reduction based on a traditional process.

The Chinese patent CN1600814A discloses a foaming method of PLA and a foamed PLA product, which provides a preparation method of a PLA foaming-specific resin like CN106751611A. PLA and additives are mixed to form a foaming precursor, and the copolymer of PLA and aromatic-aliphatic copolyester used is generally polymer particles that have been melt-blended through a PLA pelleting modification process, where the PLA is also subject to heating, melting, cooling, and so on. This patent also briefly proposes an extremely rough foaming process without detailed process parameters, which still does not get rid of the traditional process of subjecting a PLA resin pellet first to modification and pelletization and then to extrusion foaming.

The Chinese patent CN103819885B provides a foamed PLA material and a preparation method thereof. The method includes PLA pelleting modification and foaming, and one of the modifiers used is a non-degradable polyolefin. The foamed PLA material obtained by this method can only be partially degraded, but not completely degraded, and it is not an environmentally-friendly material in the true sense.

The Chinese patent CN1900389A provides a method for directly preparing a fiber product from a PLA melt, where a PLA melt is directly delivered by a pipe to a feeding port of a spinning trunk, and then the PLA melt is directly spun to obtain a fiber product. Compared with this patent, the production of the foamed PLA product of the present disclosure is more difficult, which has higher requirements for a strength, a viscosity, and the like of a PLA melt. However, a PLA melt, after flowing through a pipe for a long time at a high temperature, has a slight viscosity decrease. Moreover, a nucleating agent, a lubricant, and other agents are necessarily added to prepare a stable foamed product from a PLA material, which is different from the direct spinning method of a PLA melt. In the present disclosure, a PLA melt is directly delivered to a twin-screw extruder, and also, the resin is modified by add the additives to the melt to increase a melt strength, thus ensuring the foamability of the PLA melt. In summary, in all existing patents for preparing a foamed PLA product, a PLA resin pellet is typically dried, modified and pelletized, dried, cooled, and dried, or just modified, and then directly extruded/injected/autoclaved for foaming, where PLA needs to be repeatedly heated, cooled, melt, and blended, resulting in complicated procedures and high costs.

SUMMARY

In order to overcome the above shortcomings and deficiencies, the present disclosure provides a method and a device for directly preparing a foamed PLA product from a PLA melt, which can effectively reduce process procedures, reduce processing devices, and save energy. The present disclosure can achieve the following invention objectives:

(1) In the method for directly preparing a foamed PLA product from a PLA melt of the present disclosure, the PLA melt does not need to undergo the processes of water-cooled pelletization, repeated drying and cooling, heating and melt-blending, and so on, so the influence of drying factors and high-temperature shearing on the foamability is avoided, which can not only ensure the foamability of a material, but also ensure the quality of a foamed PLA product.

(2) The method for directly preparing a foamed PLA product from a PLA melt of the present disclosure involves reduced procedures, and avoids investment on devices for water-cooled pelletization, crystallization and drying, twin-screw pelletization, and so on and energy consumption required by these procedures. According to a comprehensive calculation, the energy consumption can be reduced by more than ⅓, and a production cost per ton can be reduced by about 3,000 yuan, which greatly reduces a cost for preparing a foamed PLA product.

(3) With the method for directly preparing a foamed PLA product from a PLA melt of the present disclosure, reduced procedures are required, a PLA viscosity is decreased little, a material is not easy to become yellow and brittle, and an obtained foamed product has uniform foam cells and low open cell rate.

(4) A foamed PLA product obtained by the method for directly preparing a foamed PLA product from a PLA melt of the present disclosure has a smooth surface, an adjustable foaming rate, and a small foam cell size.

(5) A foamed PLA product obtained by the method for directly preparing a foamed PLA product from a PLA melt of the present disclosure has a high crystallinity and a high tensile strength.

(6) A foamed PLA product obtained by the method for directly preparing a foamed PLA product from a PLA melt of the present disclosure has a low apparent density, and a foam product obtained through 5 s to 15 s of thermal baking and vacuum-forming has a thermal resistance of ≥80° C.

To achieve the objective of the present disclosure, the present disclosure adopts the following technical solutions:

The present disclosure provides a method for directly preparing a foamed PLA product from a PLA melt, including: PLA melt preparation, feeding, and two-stage extrusion.

The technical solutions of the present disclosure are further optimized below:

A PLA melt obtained from the PLA melt preparation may have a weight-average molecular weight Mw of 180,000 to 221,000 and a molecular weight distribution (IWD) of 1.21 to 1.24.

In the PLA melt preparation, lactide, stannous octoate, isooctyl alcohol, and 2-ethyloctanoic acid may have a mass ratio of 7,500:1:(10-15):0.1.

The PLA melt may be prepared by polymerization at 235° C.

The two-stage extrusion may include first-stage extrusion; and in the first-stage extrusion, a first-stage twin-screw extruder may have a length-to-diameter ratio of ≥30/1, there may be a temperature distribution of 245° C. to 195° C. from a main feeding port to an extruder die head, and a pressure at an outlet of the first-stage twin-screw extruder may be 15 MPa to 17 MPa.

In the first-stage extrusion, a feeding rate ratio of the PLA melt to a foaming additive may be (25-35):1.

A PLA melt may be fed at a rate of 250 kg/h, a foaming additive may be fed at a rate of 7.5 kg/h to 10 kg/h, and a foaming gas may be fed at a rate of 2.8 L/h to 7.5 L/h.

In the first-stage extrusion, a feeding port for the foaming additive may be ⅔ a length of a screw barrel from the main feeding port 5 and ⅓ the length of the screw barrel from the die head.

The two-stage extrusion may include second-stage extrusion; and
in the second-stage extrusion, a second-stage single-screw extruder may have a length-to-diameter ratio of ≥30/1 and an initial temperature range of 180° C. to 128° C., and a pressure at an outlet of the second-stage single-screw extruder may be 6 MPa to 8 MPa.

A foaming gas used for the first-stage extrusion may be any one from the group consisting of R22, carbon dioxide, and butane.

In the PLA melt preparation, the PLA melt may have a melt flow index of 2.0 g/10 min to 10.0 g/10 min (190° C., 2.16 kg).

In the feeding, a weight of the foaming additive may be 0.5% to 10% of a weight of the PLA;
the foaming additive may include a chain extender, a nucleating agent, and a lubricant; and
the chain extender may account for 8 wt % to 17 wt % of the foaming additive,
the nucleating agent may account for 50 wt % to 83 wt % of the foaming additive, and
the lubricant may account for 8 wt % to 17 wt % of the foaming additive.

In the feeding, a weight of the foaming additive may be 0.5% to 10% of the weight of the PLA;
the foaming additive may include a chain extender, a nucleating agent, and a lubricant; and
the chain extender may account for 16.7 wt % of the foaming additive,
the nucleating agent may account for 66.7 wt % of the foaming additive, and
the lubricant may account for 16.6 wt % of the foaming additive.

The present disclosure also provides a device for directly preparing a foamed PLA product from a PLA melt, including: a PLA polymerization unit, a first-stage twin-screw extruder, and a second-stage single-screw extruder;
where the PLA polymerization unit is connected to the first-stage twin-screw extruder, and the first-stage twin-screw extruder is connected to the second-stage single-screw extruder;
the first-stage twin-screw extruder is provided with a main feeding port, a side feeding port, and a gas injection port in sequence along a feeding direction, and the gas injection port is located at the latter half of the first-stage twin-screw extruder;
a sealing thread is provided between the side feeding port and the gas injection port;
the first-stage twin-screw extruder is connected to the second-stage single-screw extruder via a connection buckle, and a filter screen is provided between the first-stage twin-screw extruder and the second-stage single-screw extruder;
the PLA polymerization unit communicates with the first-stage twin-screw extruder via a melt pipe;

a feeding pump is further provided between the PLA polymerization unit and the melt pipe;

the melt pipe communicates with the inside of the first-stage twin-screw extruder via the main feeding port; and a tail end of the second-stage single-screw extruder is connected to a die head via a static mixer.

In the method for directly preparing a foamed PLA product from a PLA melt, a discharge port of a discharge pump of the PLA polymerization unit is connected to an extrusion foaming unit via a melt pipe equipped with an insulated jacket or a melt metering pump; a fully-polymerized PLA melt discharged from the polymerization unit is continuously fed into the first-stage twin-screw extruder of the extrusion foaming unit through the melt pipe or the melt metering pump; additives used to improve the foaming performance of the PLA melt are fed into the extruder barrel through the side feeding port of the twin-screw extruder, and mixed with the PLA melt; a high-pressure foaming gas is injected through the injection port located at the latter half of the first-stage twin-screw extruder, and mixed with a PLA/additive pre-mixture; and a melt-foaming gas mixture is continuously fed into the second-stage single-screw extruder of the extrusion foaming unit, then blended and cooled by the single-screw extruder, and then extruded through a die head for foaming to obtain a foamed PLA product.

In the present disclosure, the PLA melt discharged from the discharge pump may have a temperature of 190° C. to 250° C. and a melt flow index of 2 g/10 min to 10 g/10 min (190° C., 2.16 kg).

The PLA of the present disclosure may refer to a homopolymer or a copolymer with repeating units of lactic acid, and the repeating units may be L-optical isomers and/or D-optical isomers.

In the present disclosure, there may be a linear distance of ≤200 m between the discharge port and the feeding port of the PLA extrusion foaming unit; the connected melt pipe may be equipped with an insulated jacket, which is cyclically introduced with a heat-conducting medium for thermal insulation of the PLA melt in the melt pipe; and the melt in the pipe may have a pressure of ≥0.5 MPa. A melt metering pump can be provided before the feeding port of the PLA extrusion foaming unit to ensure a stable melt delivery pressure.

In the present disclosure, there may be at least one set or more sets of the PLA extrusion foaming units, which is a tandem two-stage extrusion foaming unit, including a first-stage twin-screw extruder and a second-stage single-screw extruder. A melt discharged from a die head of the first-stage extruder may be filtered through a filter screen first and then directly delivered to the second-stage extruder, and the filter screen may have mesh size of 40 mesh to 100 mesh.

In the present disclosure, the first-stage twin-screw extruder of the extrusion foaming unit may have a length-to-diameter ratio of ≥30 and a temperature range of 170° C. to 250° C., and is provided with a side feeding port and a gas injection port. In the present disclosure, the second-stage single-screw extruder of the extrusion foaming unit may have a length-to-diameter ratio of ≥30 and an initial set temperature of 180° C. After a gas-wrapped melt flows out from the die head, the temperature is gradually reduced to a final temperature of 110° C. to 170° C., which is in a gradual decrease trend from an extruder feeding port to a die head.

In the present disclosure, the additive for improving the foaming performance of PLA melt includes, but is not limited to, one or more from the group consisting of a chain extender, a nucleating agent, a foam cell stabilizer, and a lubricant. The chain extender may be an epoxy polymer chain extender, an oxazoline chain extender, an isocyanate chain extender, or a maleic anhydride chain extender, and may preferably be an epoxy polymer chain extender. The nucleating agent may be an inorganic nucleating agent and an organic nucleating agent. The inorganic nucleating agent may include talcum powder, calcium carbonate, titanium dioxide, or montmorillonite; and the organic nucleating agent may include citric acid, sodium citrate, or sodium bicarbonate. The foam cell stabilizer may include glycerol monostearate and talcum powder. The lubricant may include fatty acid ester, amide, stearate, and other lubricants commonly used in the processing of PLA that are well known in the industry. The foaming additive may be added at a total amount 0.5% to 10% of the weight of PLA, where the chain extender accounts for 0.3% to 3%, the nucleating agent accounts for 0.3% to 3%, the foam cell stabilizer accounts for 0% to 3%, and the lubricant accounts for 0% to 5%.

In the present disclosure, the foaming gas may include, but is not limited to, one or more from the group consisting of alkane, halogenated alkene, carbon dioxide, nitrogen, and argon, and preferably one or two from the group consisting of butane, Freon, and carbon dioxide; and the foaming gas may be injected at an amount 10% to 10% of a total weight of the PLA and the foaming additive.

The foamed PLA product of the present disclosure may include, but is not limited to, a foamed PLA sheet, foamed PLA particles, and a special-shaped foamed PLA profile, which depends on the shape of an extrusion die of the second-stage single-screw extruder. A sheet die or an annular die may be used to obtain a foamed PLA sheet. An annular die may preferably be used to obtain a microporous foamed PLA sheet. When a strip die is used, a hot-cutting die head may be used to obtain foamed PLA beads. A special-shaped die may be used to obtain a corresponding special-shaped foamed PLA profile.

Beneficial effects of the present disclosure:

(1) In the method for directly preparing a foamed PLA product from a PLA melt of the present disclosure, the PLA melt does not need to undergo the processes of water-cooled pelletization, repeated drying and cooling, heating and melt-blending, and so on, so the influence of drying factors and high-temperature shearing on the foamability is avoided, which can not only ensure the foamability of a material, but also ensure the quality of a foamed PLA product.

(2) The method for directly preparing a foamed PLA product from a PLA melt of the present disclosure involves reduced procedures, and avoids investment on devices for water-cooled pelletization, crystallization and drying, twin-screw pelletization, and so on and energy consumption required by these procedures. According to a comprehensive calculation, the energy consumption can be reduced by more than ⅓, and a production cost per ton can be reduced by about 3,000 yuan, which greatly reduces a cost for preparing a foamed PLA product.

(3) With the method for directly preparing a foamed PLA product from a PLA melt of the present disclosure, reduced procedures are required, a PLA viscosity is decreased little, a material is not easy to become yellow and brittle, and an obtained foamed product has uniform foam cells and low open cell rate.

(4) A foamed PLA product obtained by the method for directly preparing a foamed PLA product from a PLA melt of the present disclosure has a smooth surface, uniform foam cells, an adjustable foaming rate of 3 to 25, a foam cell size of ≤1 mm, and an open cell rate of <10%.

(5) A foamed PLA product obtained by the method for directly preparing a foamed PLA product from a PLA melt of the present disclosure has a crystallinity of 40.3% to 48.5% and a tensile strength of 8.7 MPa to 19.6 MPa.

(6) A foamed PLA product obtained by the method for directly preparing a foamed PLA product from a PLA melt of the present disclosure has an apparent density of 0.05 $g/cm^3$ to 0.4 $g/cm^3$, and a foam product obtained through 5 s to 15 s of thermal baking and vacuum-forming has a thermal resistance of ≥80° C.

In order to allow further comprehension of the content of the present disclosure, the present disclosure is described in detail below with reference to drawings.

DETAILED DESCRIPTION OF THE EMBODIMENTS

Figure 1:
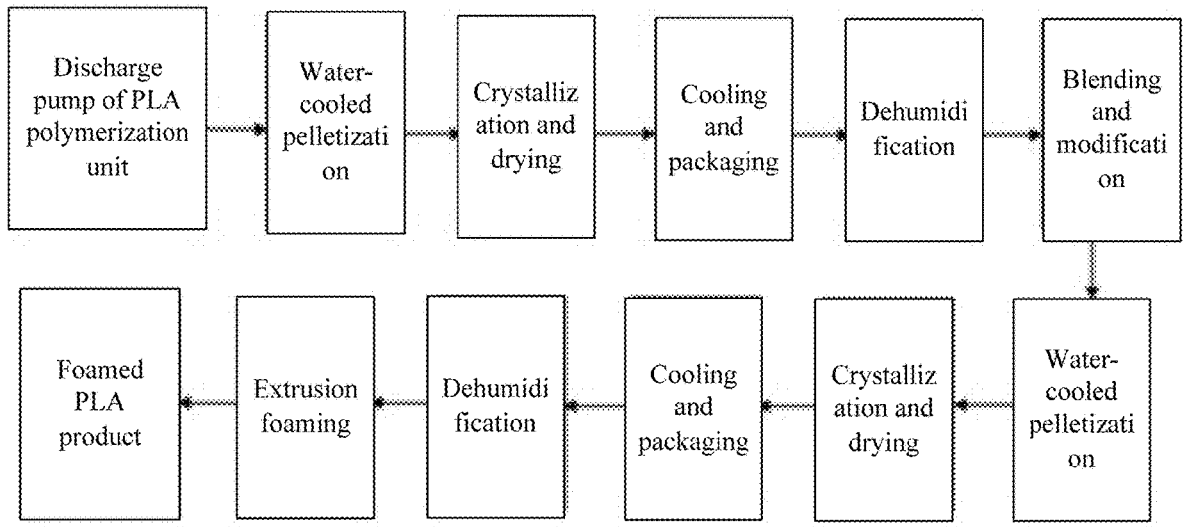
FIG. 1 is a flow chart of a process for preparing a foamed product from a PLA melt in the prior art mentioned in the present disclosure.

The following specific examples facilitate a better understanding of the present disclosure, but do not limit the present disclosure. Unless otherwise specified, the experimental methods in the following examples are conventional methods. Unless otherwise specified, the materials used in the following examples are conventional materials. For the tests in the following examples, unless otherwise specified, three duplicate tests are set, and results are averaged. The present disclosure is further described below with reference to examples.

Example 1 a Method for Directly Preparing a Foamed PLA Product from a PLA Melt As shown in FIG. 3 to FIG. 6, the method for directly preparing a foamed PLA product from a PLA melt of the present disclosure includes the following steps:

Step 1: Preparation of a PLA Melt

Lactide (a main raw material) was heated and melted, and then mixed with stannous octoate (a catalyst) and isooctyl alcohol (an initiator) to start polymerization, where the lactide, stannous octoate, and isooctyl alcohol had a mass ratio of 7,500:1:13, and the polymerization was conducted at 235° C. After the polymerization was completed, 2-ethyl-octanoic acid (chain terminator) was added to terminate the reaction, where the lactide and terminator had a mass ratio of 75,000:1. The monomer was removed by devolatilization to obtain a PLA melt, which had a melt flow index of about 3.7 g/10 min (190° C., 2.16 kg), a weight-average molecular weight Mw of about 205,000, and an MWD of 1.21.

Step 2: Feeding

By the feeding pump 2 connected behind the unit 1, the PLA melt was continuously fed into the first-stage twin-screw extruder 4 through the main feeding port 5 at a pressure of about 1.8 MPa, a temperature of 245° C., and a delivery speed of 250 kg/h; and a foaming additive was fed into the first-stage twin-screw extruder 4 through the side feeding port 6 at a speed of 7.5 kg/h.

In the foaming additive:

BASF Joncryl ADR 4370 was used as a chain extender, accounting for 16.7 wt % of a total amount of the foaming additive, A 2000-mesh talcum powder was used as a nucleating agent, accounting for 66.7% of the total amount of the foaming additive, and Zinc stearate was used as a lubricant, accounting for 16.6 wt % of the total amount of the foaming additive.

Step 3: Two-Stage Extrusion

A. First-Stage Extrusion:

The first-stage twin-screw extruder had a length-to-diameter ratio of 40/1, and the following temperatures were set from the main feeding port 5 to the extruder die head: 245° C., 240° C., 235° C., 230° C., 225° C., 220° C., 215° C., 210° C., 205° C., and 195° C.

The foaming gas R22 (difluoromonochloromethane) was injected at a position between the main feeding port 5 and the die head of the first-stage twin-screw extruder, specifically at a position ⅔ a length of a screw barrel from the main feeding port 5 and ⅓ the length of the screw barrel from the die head.

The foaming gas R22 was injected into the first-stage twin-screw extruder 4 at a speed of 7.5 L/h and a pressure of 20 MPa. A speed of the second-stage single-screw extruder 9 was adjusted such that a pressure at an outlet of the first-stage twin-screw extruder 4 was maintained at about 15 MPa to 17 MPa and a pressure at an outlet of the first-stage single-screw extruder 4 was maintained at about 6 MPa to 8 MPa.

B. Second-Stage Extrusion

The second-stage single-screw extruder had a length-to-diameter ratio of 40/1, and the following initial temperatures were set: 180° C., 180° C., 180° C., 180° C., 180° C., 180° C., 180° C., and 180° C.

A speed of the second-stage single-screw extruder was adjusted such that a pressure at an outlet of the first-stage twin-screw extruder was maintained at about 15 MPa to 17 MPa and a pressure at an outlet of the second-stage single-screw extruder was maintained at about 6 MPa to 8 MPa.

An annular die was used as the die head. When a gas-wrapped PLA melt flowed out from the die, the temperature of the second-stage single-screw extruder was gradually reduced to 170° C., 160° C., 150° C., 140° C., 135° C., 132° C., 132° C., 132° C. within about 30 min.

A foamed PLA material with a smooth surface and dense pores was obtained.

Performance characterization: Test results were shown in Table 2.

Examples 2 to 3 A Method for Directly Preparing a Foamed PLA Product from a PLA Melt The foaming processes used in Examples 2 to 3 were the same as that in Example 1, except that the components of the raw material and additive had different proportions, and process parameters such as temperature and die head pressure were controlled differently. Process conditions were shown in Table 1, and results were shown in Table 2.

TABLE 1

| | PLA melt | | Foaming additive | Foaming gas | Feeding rate | First-stage extruder temperature | First-stage outlet pressure | Second-stage extruder temperature | Second-stage outlet pressure |
|---|---|---|---|---|---|---|---|---|---|
| Example 1 | Mass ratio of lactide:stannous octoate:isooctyl alcohol:2-ethyloctanoic acid: 7,500:1:13:0.1 | 3.7 g/10 min (190° C., 2.16 kg); Mw: 205,000; and MWD: 1.21 | 1.8 Mpa | Discharge rate: 7.5 kg/h, Joncryl ADR 4370, 16.7 wt %, 2000-mesh talcum powder, 55.7%, zinc stearate, 16.6 wt %; | R22 7.5 L/h | 250 kg/h | 245° C. 240° C. 235° C. 230° C. 225° C. 220° C. 215° C. 210° C. 205° C. 195° C. | 15 Mpa to 17 Mpa | 170° C. 160° C. 150° C. 140° C. 135° C. 130° C. 128° C. 128° C. | 6 Mpa to 8 Mpa |
| Example 2 | Mass ratio of lactide:stannous octoate:isooctyl alcohol:2-ethyloctanoic acid: 7,500:1:15:0.1 | 5.1 g/10 min (190° C., 2.16 kg); Mw: 180,200; and MWD: 1.24 | 1.8 Mpa | Discharge rate: 7.5 kg/h, Joncryl ADR 4370, 33.3 wt %, 5000-mesh talcum powder, 50%, zinc stearate, 16.7 wt %; | Carbon dioxide 2.8 L/h | 250 kg/h | 245° C. 240° C. 235° C. 230° C. 225° C. 220° C. 215° C. 210° C. 205° C. 195° C. | 13.8 Mpa | 170° C. 160° C. 155° C. 145° C. 142° C. 142° C. 142° C. 142° C. | 7 Mpa to 9 Mpa |
| Example 3 | Mass ratio of lactide:stannous octoate:isooctyl alcohol:2-ethyloctanoic acid: 7,500:1:10:0.1 | 2.8 g/10 min (190° C., 2.16 kg); Mw: 221,000; and MWD: 1.21 | 2.48 Mpa | Discharge rate: 8.75 kg/h, Joncryl ADR 4370, 8.8 wt %, 5000-mesh talcum powder, 82.8%, zinc stearate, 8.8 wt %; | Butane 4.5 L/h | 250 kg/h | 245° C. 240° C. 235° C. 230° C. 225° C. 220° C. 215° C. 210° C. 205° C. 195° C. | 18 Mpa to 20 Mpa | 170° C. 160° C. 150° C. 145° C. 143° C. 140° C. 140° C. 140° C. | 6 Mpa to 8 Mpa |

An analytical balance was used to test an apparent density of the foamed product according to the standard GB1033-86, ULTRAFOAM 1000 (U.S. Quantachrome Instruments) was used to determine an open cell rate of the foamed product;

a foam cell size was determined as follows: under a microscope, a cross section of the foamed sheet was observed to measure the diameters of 100 foam cells, and an average diameter was calculated;

a tensile strength of the sheet was tested with a universal testing machine with reference to the national standard GB/T6344-2008; and the sheet was made into tray products by the same positive or negative pressure blister molding process, and the heat resistance was tested with water at different temperatures.

In order to test the influence of different processes on the material performance, a part of melt was taken from the outlet of the second-stage single-screw extruder to test a melt flow index MI according to GB/T 3682-2000.

Comparative Examples 1 to 2

A commercially-available foam-grade PLA resin A of a specified brand was purchased, which had a PLA content of 96%, a foaming additive content of 4%, a melt flow index of 3.5 g/min (190° C., 2.16 kg, Mw: 207,000, and MVWD: 1.43), and a moisture content of >1,000 ppm. This PLA resin was obtained by subjecting 96% of pure PLA resin particles and 4% of other additives to melt-blending, which had undergone the processes of polymerization, pelletization, drying, heating and melting, pelletization and drying, etc. before being purchased.

In order to investigate the influence of the dryness degree on a PLA foaming process, two conditions were selected to implement the comparative examples.

Comparative Example 1: An Undried PLA Resin A was Used for Foaming; and

Comparative Example 2: A Dried PLA Resin A was Used for Foaming

An implementation process of Comparative Example 1: The PLA melt delivery pipe and the discharge port of the present disclosure were closed, and the purchased PLA resin A was directly fed into the first-stage extruder 4 through the feeding port 5 without being dried. A discharge rate was set to 250 kg/h, and temperatures from the feeding port 5 to the die head of the first-stage extruder 4 were set as the same as that in Example 1: 245° C., 240° C., 235° C., 230° C., 225° C., 220° C., 215° C., 210° C., 205° C., and 195° C. R22 was used as a foaming gas, which was injected at a speed of 7.5 L/h. The second-stage single-screw extruder 9 had a length-to-diameter ratio of 40/1, with the following initial set temperatures: 180° C., 180° C., 180° C., 180° C., 180° C., 180° C., 180° C., and 180° C. A speed of the second-stage twin-screw extruder 9 was adjusted such that a pressure at an outlet of the first-stage twin-screw extruder 4 was maintained at about 15 MPa to 17 MPa and a pressure at an outlet of the second-stage twin-screw extruder 9 was maintained at about 6 MPa to 8 MPa. An annular die was used as the die head. When a gas-wrapped PLA melt flowed out from the die, the temperature of the second-stage twin-screw extruder 9 was gradually reduced to 170° C., 160° C., 150° C., 140° C., 135° C., 132° C., 132° C., and 132° C. within about 30 min. A foamed sheet was obtained. However, the process was unstable, and the sheet had surface cracks and holes.

Compared with Comparative Example 1, in Comparative Example 2, the PLA resin A was first subjected to dehumidification at 80° C. for 4 h (dew point: −80° C.) and then fed into the feeding port 6, and treatments were conducted under the same conditions to obtain a foamed sheet. Results were shown in Table 2.

sheet obtained by Freon R22 foaming has a high foaming rate, a thin foam cell wall, and a high crystallization speed, so the product has prominent heat resistance. A low rate, a thick foam cell wall, a low crystallization speed, and a low crystallinity corresponds to poor heat resistance, so a material obtained by carbon dioxide foaming has a relatively-low heat-resistant temperature.

In Examples 1 to 3, the PLA melt is subjected to chain extension modification in the first-stage twin-screw extruder, and blended in the second-stage single-screw extruder, which results in little decrease in the melt flow index. It can be seen from the MI test results in Table 1 that the material undergoes little molecular weight decrease and thermal degradation, so the material can retain prominent strength and foaming performance.

The PLA resin A used in Comparative Examples 1 to 2 is modified PLA with a relatively-high additive content, which has a broadened MWD due to the twin-screw blending process. In Comparative Example 1, an undried PLA resin A is used for foaming. Due to a high moisture content, the process is unstable, and the obtained sheet has many sharkskin textures and even holes on the surface, a relatively-high open cell rate, and foam cell cracks (resulting in textures). In Comparative Example 2, although a dried PLA resin A is used and a foaming process similar to that of Example 1 is used, due to repeated heating, cooling, melting, and blending, the obtained foamed product has relatively low foaming rate and strength, large foam cell size, high open cell rate, and slightly yellow color, indicating that some thermal

TABLE 2

| | MI (190° C., 2.16 kg) | Sheet thickness (mm) | Sheet appearance | Foaming rate | Apparent density (g/cm$^2$) | Average foam cell size (μm) | Open cell rate (%) | Crystallinity (%) | Tensile strength (MPa) | Heat resistance |
|---|---|---|---|---|---|---|---|---|---|---|
| Example 1 | 3.2 | 3.5 | smooth surface, with uniform foam cells | 15.4 | 0.08 | 345 | 7.6 | 48.5 | 8.7 | boiled water can be filled, without deformation |
| Example 2 | 3.5 | 2.2 | smooth surface, with dense and uniform foam cells | 7.2 | 0.17 | 112 | 4.2 | 40.3 | 19.6 | 80° C. water can be filled, without deformation |
| Example 3 | 2.7 | 3.1 | smooth surface, with dense and uniform foam cells | 11.8 | 0.11 | 278 | 5.1 | 43.8 | 12.4 | 80° C. water can be filled, without deformation |
| Comparative Example 1 | 6.9 | 2.5 | rough surface, with sharkskin textures and holes, slightly yellow | 9.2 | 0.13 | 654 | 37.3 | 27.9 | 6.3 | with many surface defects, vacuum-forming is failed |
| Comparative Example 2 | 4.8 | 3.2 | smooth surface, with uniform foam cells, slightly yellow | 12.6 | 0.10 | 468 | 11.4 | 44.6 | 8.5 | 80° C. water can be filled, without deformation |

It can be seen from Table 2 that the foamed PLA product obtained by the method of the present disclosure has prominent adaptability and stability; and foamed products with different thicknesses and foaming rates can be obtained by the method of the present disclosure.

The foamed PLA product obtained by carbon dioxide foaming has a relatively-low foaming rate and a small thickness, but dense foam cells, a smooth surface, and a high strength; the product obtained by R22 foaming has a large foam cell size, a relatively-high open cell rate, and a low strength, but a large thickness and a high rate; and a product obtained by butane foaming has medium properties. The degradation occurs. Although the PLA resin A used in Comparative Examples 1 to 2 has an initial MI close to that of the examples, after the plasticizing and blending by the first-stage twin-screw extruder and the second-stage single-screw extruder, the melt flow index MI is increased largely, especially in Comparative Example 1, the presence of moisture aggravates the damp and thermal degradation of the material, resulting in unstable foaming and poor material performance.

The foamed PLA product obtained by the method of the present disclosure has high foaming rate, small foam cell size, low open cell rate, high strength, and prominent heat resistance, and the production process omits the processes of pelletization, crystallization, drying, modification and pelletization, and crystallization and drying, which reduces the cost by 3,000 yuan per ton.

Example 4 A Device for Directly Preparing a Foamed Product from a PLA Melt

The device for preparing a foamed PLA product of the present disclosure is described in detail below:

As shown in FIG. 3 to FIG. 6, the device for directly preparing a foamed product from a PLA melt of the present disclosure includes: a PLA polymerization unit 1, a first-stage twin-screw extruder 4, and a second-stage single-screw extruder 9. The first-stage twin-screw extruder 4 is mainly used for thorough blending of a PLA melt and a foaming additive and for the initial mixing with a foaming gas. The second-stage single-screw extruder 9 is mainly used for the mixing of a PLA/foaming additive mixture with a foaming gas and for cooling until a temperature is reduced to a range suitable for foaming. The first-stage twin-screw extruder 4 and the second-stage single-screw extruder 9 can be arranged vertically. The first-stage twin-screw extruder 4 is a co-rotating twin-screw extruder with a length-to-diameter ratio of ≥30, which is connected to a melt delivery pipe 3 through an opening at a side of a feeding end of a screw barrel of the first-stage twin-screw extruder 4. A side feeding port 6 is opened above the feeding port on the screw barrel to feed a foaming additive, and the foaming additive can be fed through a feeding unit installed at the side feeding port 6. A gas injection port 7 is provided at position ⅔ to ¾ of a total length of the screw barrel from the main feeding port 5 to inject a foaming gas.

A sealing thread is provided between the side feeding port 6 and the gas injection port 7, and a high-pressure gas is blocked in the mixing section through local melt pressure to prevent an injected gas from escaping through the feeding ports (main feeding port 5 and side feeding port 6). Other parts such as barrel heating and temperature control are the same as that of a general extruder.

Figure 2:
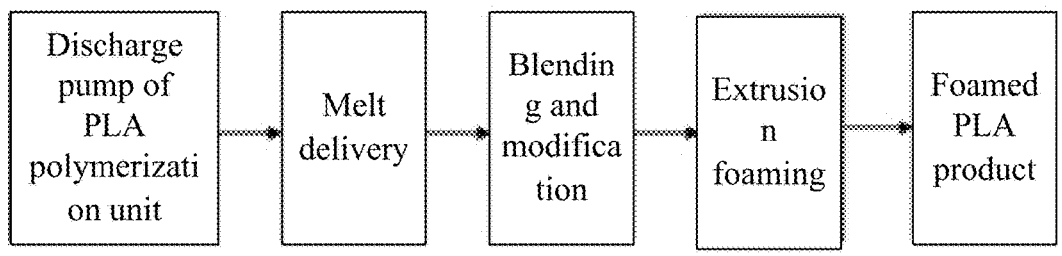
FIG. 2 is a flowchart of the method for preparing a foamed product from a PLA melt according to the present disclosure.
Figure 3:
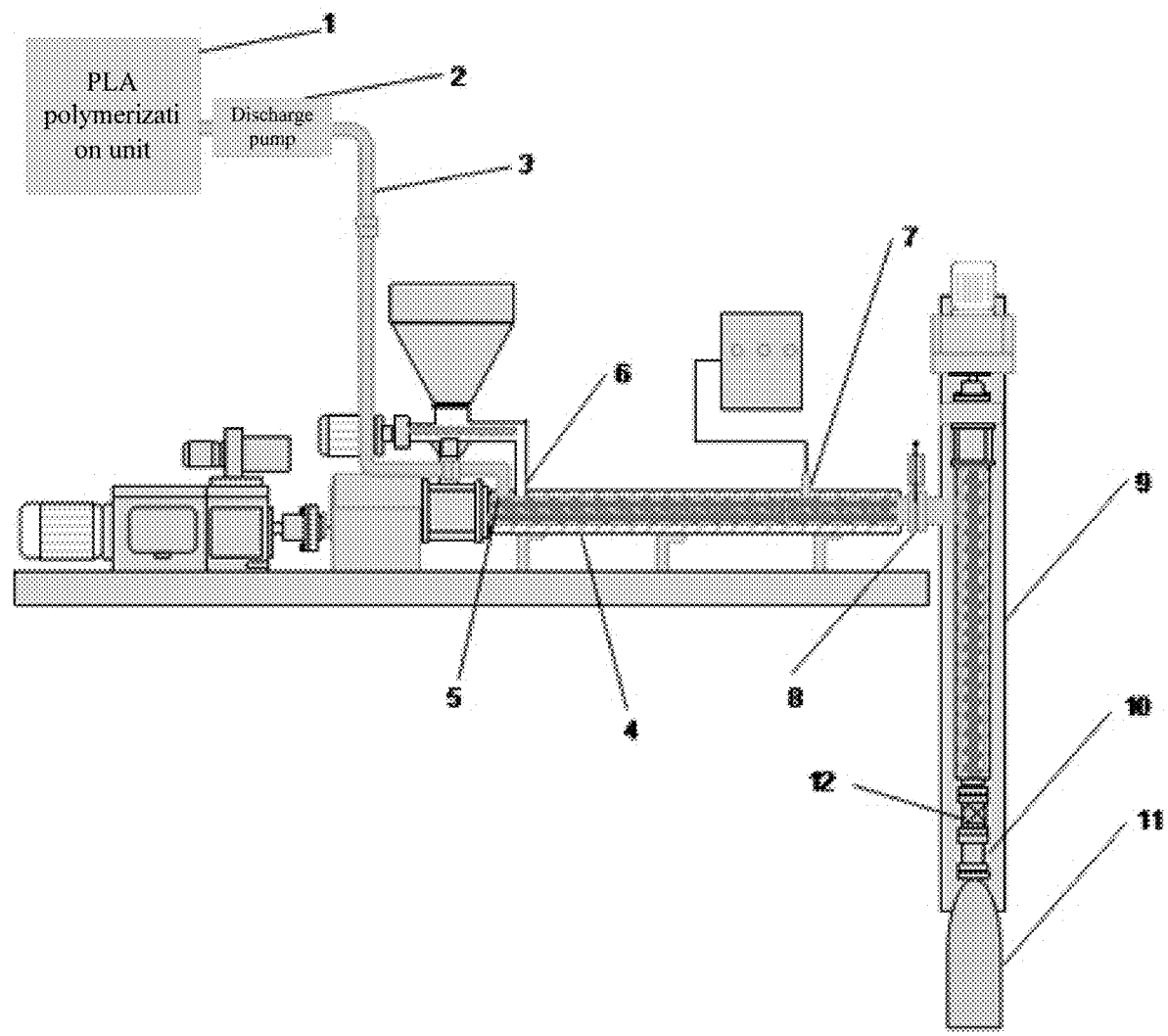
FIG. 3 is a schematic diagram illustrating the connection between the PLA polymerization unit and the PLA extrusion foaming unit according to the present disclosure, where 1 represents a PLA polymerization unit, 2 represents a feeding pump, 3 represents a melt pipe, 4 represents a first-stage twin-screw extruder, 5 represents a main feeding port, 6 represents a side feeding port, 7 represents a gas injection port, 8 represents a filter screen, 9 represents a second-stage single-screw extruder, 10 represents a die head, 11 represents a foamed PLA product, and 12 represents a static mixer.

The second-stage single-screw extruder 9 adopts an ET screw structure or a multi-head spiral grooved structure to achieve a prominent melt cooling effect. The PLA polymerization unit 1 communicates with the first-stage twin-screw extruder 4 via a melt pipe 3, and a filter screen 8 is provided between the first-stage twin-screw extruder 4 and the second-stage single-screw extruder 9. Specifically, as shown in FIG. 2, the first-stage single-screw extruder 4 is connected to the second-stage single-screw extruder 9 via a unit shown in FIG. 4.

Figure 4:
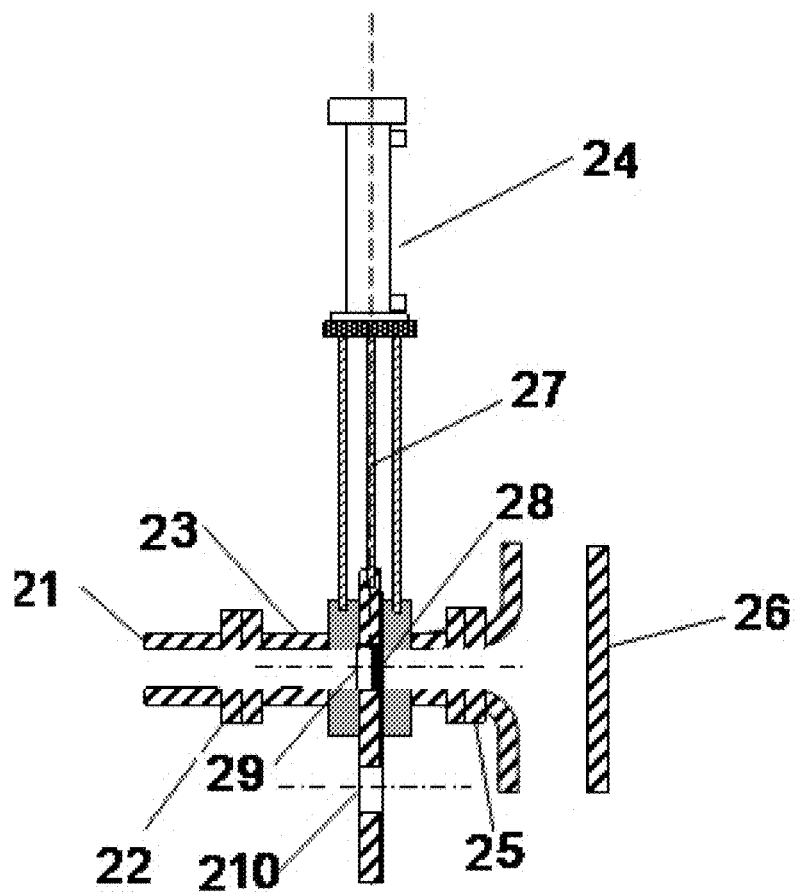
FIG. 4 is an enlarged view of the connection between the first-stage twin-screw extruder and the second-stage single-screw extruder according to the present disclosure, where 21 represents a screw barrel, 22 represents a connection buckle, 23 represents an insulated stainless steel connecting tube, 24 represents a hydraulic screen changing system, 25 represents a connection buckle, 26 represents a second-stage single-screw extruder screw barrel, 27 represents a piston rod, and 29 and 210 represent through holes.

In FIG. 4, the screw barrel 21 of the first-stage twin-screw extruder 4 is connected to an insulated stainless steel connecting tube 23 equipped with a hydraulic screen changing system 24 via a connection buckle 22; and the other end of the insulated stainless steel connecting tube 23 is connected to the feeding port of the second-stage single-screw extruder 9 via a connection buckle 25. A piston rod 27 of the hydraulic screen changing system 24 can drive a module provided with two through holes 29 and 210 to move up and down, and a filter screen 8 can be placed at the through holes 29 and 210. The hydraulic screen changing system can realize the replacement of a filter screen during a production process.

A feeding pump 2 is further provided between the PLA polymerization unit 1 and the melt pipe 3.

The first-stage twin-screw extruder 4 is provided with a main feeding port 5, a side feeding port 6, and a gas injection port 7 in sequence along a feeding direction. From a segmented schematic diagram of the first-stage twin-screw extruder 4 shown in FIG. 6, the positional relationship of the main feeding port 5, side feeding port 6, and gas injection port 7 can be clearly seen. That is, there are 10 uniform segments from the feeding end to the discharge end of the screw barrel of the first-stage twin-screw extruder 4, where the 10th segment is connected to the discharge port, the main feeding port 5 is provided in the 1st segment, the side feeding port 6 (which can be opened at a side or top of the barrel, and is collectively called the side feeding port 6 to distinguish from the main feeding port 5) is provided in the 2nd segment, and the gas injection port 7 is provided in the 8th or 9th segment. The PLA melt enters the barrel cavity of the first-stage twin-screw extruder 4 from the 1st segment; after the cavity is filled, the foaming additive is fed into the barrel cavity through the side feeding port 6 and mixed with the PLA melt; and when the melt is advanced to the 7th or 8th segment through twin-screw blending, the melt is thoroughly mixed basically, at which time, the foaming gas is injected through the gas injection port 7 and mixed with the melt. The side feeding port 6 must be provided behind the main feeding port 5, and the gas injection port 7 must be provided behind the side feeding port 6 and must be located at the latter half of the first-stage twin-screw extruder 4.

The melt pipe 3 communicates with the inside of the first-stage twin-screw extruder 4 via the main feeding port 5; and an end of the second-stage single-screw extruder 9 is connected to a static mixer 12, and the static mixer 12 is connected to a die head 10 for extruding a foamed product. The die head 10 can be a common die head for extrusion foaming of polystyrene on the market. The die head 10 can be replaced, and can be an adjustable die gap tube die head, a porous strip die head, a plate die head, etc.

Further, the melt pipe 3 is equipped with an insulated jacket, and a heat-conducting medium is circulated in the insulated jacket for thermal insulation of the PLA melt in the melt pipe 3.

Figure 5:
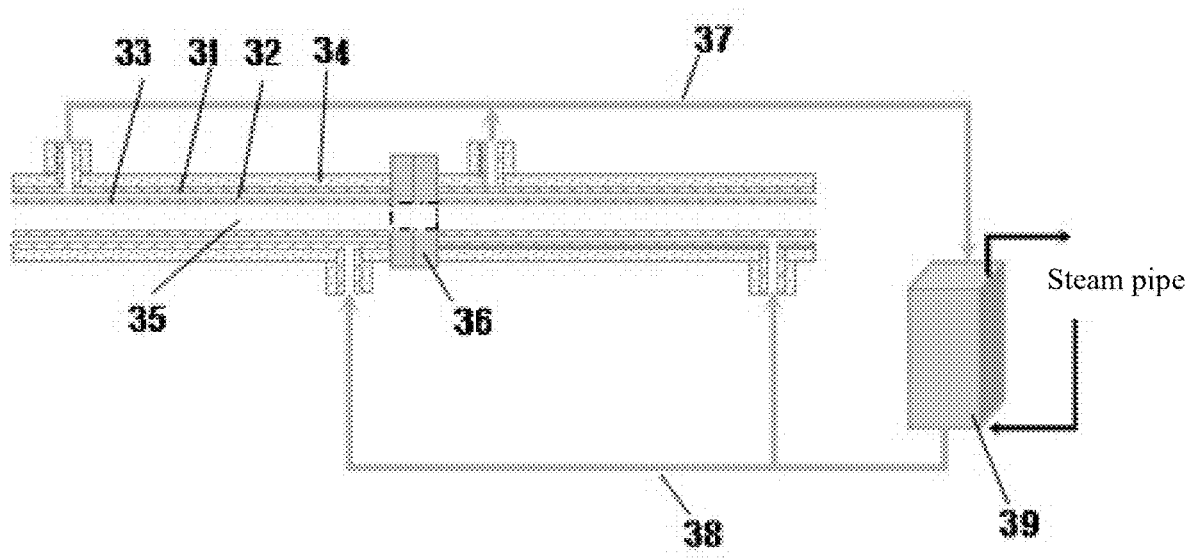
FIG. 5 is a schematic structural diagram of the melt pipe according to the present disclosure, where 31 represents a spacer, 32 represents a spacer cavity, 33 represents a PLA melt pipe, 34 represents an insulating material, 35 represents a PLA melt pipe cavity, 36 represents a connection buckle, 37 represents a pipe, 38 represents a pipe, and 39 represents a conductive drum.
Figure 6:
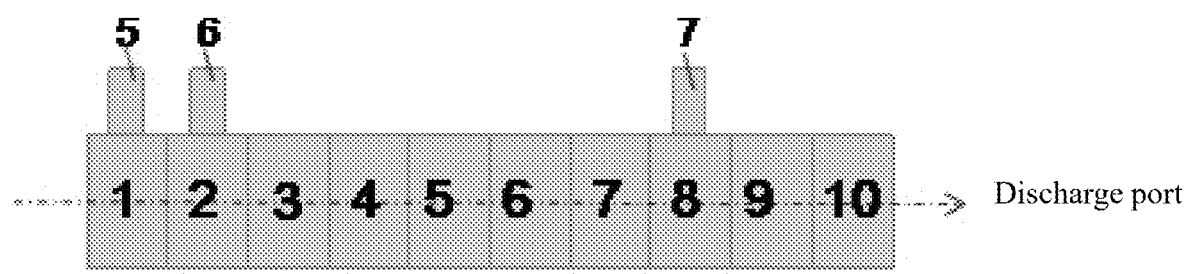
FIG. 6 is a schematic diagram of a segmented structure of the first-stage twin-screw extruder according to the present disclosure.

FIG. 5 is schematic structural diagram of the melt pipe 3. A spacer 31 is an outer insulated jacket, and heat-conducting oil can be introduced into a spacer cavity 32 of the spacer 31 through a pipe 38, and discharged into a container such as a conductive drum 39 through a pipe 37. The conductive drum 39 can be continuously heated by steam such that it is kept at the same temperature as the PLA melt, thus achieving thermal insulation. Moreover, the spacer 31 is wrapped with an insulating material outside to achieve a better thermal insulation effect. The pipes can be connected in segments via connection buckles 36.

Further, in the melt pipe 3, there is a linear distance of ≤200 m between an outlet of the feeding pump 2 to the main feeding port 5 of the first-stage twin-screw extruder 4, which is moderate and leads to the lowest energy consumption.

Further, the first-stage twin-screw extruder 4 is a twin-screw extruder with a length-to-diameter ratio of ≥30, which provides the optimal blending effect; the second-stage single-screw extruder 9 is a single-screw extruder with a length-to-diameter ratio of ≥30; and the PLA polymerization unit 1 is connected to at least one melt pipe 3 such that multiple passages can be provided simultaneously, which greatly improves the production efficiency of a foamed product.

Further, substances fed through the side feeding port 6 may include one or more from the group consisting of a chain extender, a melt enhancer, a foam retaining agent, a nucleating agent, and a chemical foaming agent.

Further, substances fed through the gas injection port 7 may include one or more from the group consisting of alkane, halogenated alkene, carbon dioxide, nitrogen, argon, and other foaming gases.

The foamed product 11 of the present disclosure may include, but is not limited to, a foamed PLA sheet, foamed PLA particles, a foamed PLA tube, and a special-shaped foamed PLA profile.

A working process of the device for preparing a foamed PLA product according to the present disclosure is as follows: a PLA melt is obtained by polymerization in the PLA polymerization unit 1, then subjected to devolatilization, and then delivered to the feeding pump 2; the PLA melt is delivered into a melt pipe 3 under insulation of a heat-conducting medium by the feeding pump 2, and then delivered to the main feeding port 5 of the first-stage twin-screw extruder 4 of the PLA extrusion foaming unit; a chain extender, a foam retaining agent, and a nucleating agent are thoroughly mixed in advance, then fed into the first-stage twin-screw extruder 4 through the side feeding port 6 at a rate matching a melt feeding rate, and mixed with the PLA melt; a high-pressure foaming gas is injected into the twin-screw extruder through the gas injection port 7 and mixed with the melt; a preliminary melt-gas mixture is filtered through a filter screen 8 and then delivered to the second-stage single-screw extruder 9 where the mixture is further plasticized, mixed, and cooled; and then the melt is homogenized by a static mixer 12 and then extruded through a die head 10 for foam molding to obtain the foamed PLA product 11.

In the present disclosure, the main function of the first-stage twin-screw extruder is to thoroughly mix a PLA melt with a foaming additive and then preliminarily mix a resulting mixture with a foaming gas; and the main function of the second-stage single-screw extruder is to thoroughly mix a melt mixture with the foaming gas. In the present disclosure, a PLA polymerization production line is directly connected with a PLA foaming production line, such that a PLA melt directly flows into an extrusion foaming unit, and the modification and foaming of PLA pellets are completed online.

Unless otherwise specified, the percentages used in the present disclosure are all weight percentages, and the ratios in the present disclosure are all mass ratios.

Although the examples of the present disclosure have been illustrated and described, it should be understood that those of ordinary skill in the art may make various changes, modifications, replacements, and variations to the above examples without departing from the principle and spirit of the present disclosure, and the scope of the present disclosure is limited by the appended claims and legal equivalents thereof.

What is claimed is:

1. A method for directly preparing a foamed polylactic acid (PLA) product from a PLA melt, comprising: PLA melt preparation, feeding, and two-stage extrusion, wherein
    the PLA melt obtained from the PLA melt preparation has a weight-average molecular weight of 200,000 to 221,000 and a molecular weight distribution of 1.21 to 1.24; and
    the two-stage extrusion comprises first-stage extrusion and a second-stage extrusion, wherein
    in the first-stage extrusion, a first-stage twin-screw extruder has a length-to-diameter ratio of 40:1, and a temperature distribution of 245° C. to 195° C. in a gradual decrease trend from a main feeding port of the first-stage twin-screw extruder to a die head, and
    in the second-stage extrusion, a second-stage single-screw extruder has a length-to-diameter ratio of ≥30:1, and a temperature range of 180° C. to 128° C.

2. The method for directly preparing the foamed PLA product from the PLA melt according to claim 1, wherein in the feeding, a feeding rate ratio of the PLA melt to a foaming additive is 25-35:1.

3. The method for directly preparing the foamed PLA product from the PLA melt according to claim 1, wherein in the first-stage extrusion, a feeding port for a foaming additive is located at a position of ⅔ a length of a screw barrel from the main feeding port and ⅓ the length of the screw barrel from the die head.

4. The method for directly preparing the foamed PLA product from the PLA melt according to claim 1, wherein a foaming gas used for the first-stage extrusion is one selected from the group consisting of alkane, halogenated alkene, carbon dioxide, nitrogen, argon, and Freon.

5. The method for directly preparing the foamed PLA product from the PLA melt according to claim 1, wherein in the PLA melt preparation, a mass ratio of lactide, stannous octoate, isooctyl alcohol, and 2-ethyloctanoic acid is 7,500:1:10-15:0.1.

6. The method for directly preparing the foamed PLA product from the PLA melt according to claim 1, wherein in the feeding, a weight of a foaming additive is 0.5% to 10% of a weight of the PLA melt;
    the foaming additive comprises a chain extender, a nucleating agent, and a lubricant, wherein
    the chain extender accounts for 8 wt % to 17 wt % of the foaming additive,
    the nucleating agent accounts for 50 wt % to 83 wt % of the foaming additive, and
    the lubricant accounts for 8 wt % to 17 wt % of the foaming additive.

7. The method for directly preparing the foamed PLA product from the PLA melt according to claim 1, wherein a foaming gas used for the first-stage extrusion is one selected from the group consisting of alkane, halogenated alkene, carbon dioxide, nitrogen, argon, and Freon.

* * * * *